United States Patent [19]

Zittel

[11] Patent Number: 4,688,476
[45] Date of Patent: Aug. 25, 1987

[54] INDUSTRIAL FOOD PROCESSING MACHINE

[75] Inventor: David R. Zittel, Columbus, Wis.

[73] Assignee: Lyco Manufacturing, Inc., Columbus, Wis.

[21] Appl. No.: 872,809

[22] Filed: Jun. 11, 1986

[51] Int. Cl.⁴ ............................................. A47J 37/12
[52] U.S. Cl. .................................... 99/403; 220/329; 220/333; 220/337
[58] Field of Search ................. 99/403, 410, 279, 330, 99/345; 126/344, 345, 373; 220/252, 329, 333, 337

[56] References Cited

U.S. PATENT DOCUMENTS

| | | |
|---|---|---|
| 1,019,198 | 3/1912 | Spears . |
| 1,300,710 | 4/1919 | Edwards . |
| 1,914,616 | 6/1933 | Power . |
| 2,371,194 | 3/1945 | Socke et al. ........................ 220/333 |
| 2,520,508 | 8/1950 | Morrison . |
| 2,653,509 | 9/1953 | Nineberg ............................ 220/333 |
| 3,311,255 | 3/1967 | Loveless . |
| 3,555,732 | 1/1971 | Ballard . |
| 3,653,533 | 4/1972 | Mortensen . |
| 4,585,266 | 4/1986 | Steinberg ........................... 220/333 |
| 4,589,567 | 5/1986 | Pitcher ............................... 220/337 |

OTHER PUBLICATIONS

LYCO Advertisement for Blancher which is Cunterweighted to Open on One side.
Apache Advertisement for Blancer which is Counterweighted to Open on One Side.
Food Production/Management, "New Robins Blancher has Large Drum and CIP Features", Apr. 1986.

Primary Examiner—Henry S. Jaudon
Attorney, Agent, or Firm—Isaksen, Lathrop, Esch, Hart & Clark

[57] ABSTRACT

An industrial food processing machine which utilizes a closed environment to subject a food product flow to a continuous, controlled temperature treatment with water, and which provides access to its entire interior from both sides of the machine for the cleaning or maintenance thereof is disclosed which includes a tank which is adapted to contain apparatus for conveying food products through the liquid environment in the tank, a cover which effectively closes the tank, releasable hinges between the cover and tank on both sides which allow the cover to open from either side while releasing the hinges on the other side, and an operator which includes pneumatic cylinders which selectively open the cover of the tank from either side.

11 Claims, 5 Drawing Figures

INDUSTRIAL FOOD PROCESSING MACHINE

BACKGROUND OF THE INVENTION

The present invention relates to industrial food processing machines and the means by which access is gained to the interior thereof. More specifically the present invention relates to industrial food processing machines of considerable size which utilize water in an enclosed environment to blanch, cook or cool a continuous food product flow, and the means by which access is gained to the interior of such a machine.

DESCRIPTION OF THE PRIOR ART

Industrial food processing machines of considerable size which utilize water in an enclosed environment to blanch, cook or cool a continuous food product flow before canning or freezing are well-known. Furthermore, several different means have been developed to gain access to the interiors of such machines either through openings in the heavy covers or by lifting and opening the heavy covers.

For example, one industrial food processing machine commonly used as a blancher includes an elongated open tank, an elongated vaulted cover adapted to fit over the tank and a large helical auger mounted within the interior space of the machine defined by the tank and vaulted cover to cause food to flow from an inlet end of the machine to a discharge end of the machine. The helical auger has stainless steel flights and a surrounding cylindrical screen for containing the food within the helical path between the auger flights. The cover of the machine has two sides, each with three to five two foot square doors which slide to open. When the doors are opened, workers can gain access to much of the interior of the machine to clean or maintain the auger and other interior parts. These doors, however, are not large enough to conveniently gain access to the entire interior of the machine. Furthermore, the doors tend to leak, and may leak increasingly as time passes.

Another commercial blancher is designed with substantially the same open tank and interior parts, except that the cover has no doors, but is hingedly attached to the tank on one side and a large counterweight is mounted on the same side of the cover to allow a user to open the heavy cover relatively easily on the side opposite the hinges and counterweight. Other similarly designed machines utilize pneumatic or hydraulic cylinders to automatically raise and open the hinged cover. Either of these machines only allow the user full access to one side of the machine interior, because the helical auger and surrounding screen blocks access to the hinged side from the open side.

In the food processing industry, many uses of the machine require access to clean both sides of the machine interior. A commercial blancher has been designed which utilizes four jackscrews near each of four corners of the machine to completely lift the cover up off from the tank. Each jackscrew is powered by an individual electrical motor with gearbox. This design is very expensive, costing an additional $10,000 to $15,000 per machine, and is maintenance intensive because the four individual electrical motors and gearboxes are subjected to a hostile damp environment which may cause rust, leakage and deterioration of the complicated machinery.

Accordingly, a need exists for an industrial food processing machine which allows convenient, dependable and inexpensive access to its interior from both sides of the tank for cleaning and maintenance.

SUMMARY OF THE INVENTION

The present invention is summarized in that an industrial food processing machine which utilizes an enclosed environment to subject a food product flow to a continuous, controlled temperature treatment with water, and which provides access to its entire interior for the cleaning or maintenance thereof, includes an elongated open top tank which has a body with a pair of ends and elongated sides wherein the ends and sides define the upper margin of the tank. The tank is adapted to contain apparatus for conveying food products through a liquid environment in the tank. The machine further includes an elongated cover with a pair of ends and elongated sides which define a lower margin of the cover. The lower margin of the cover is adapted to fit onto the upper margin of the tank to effectively close the tank. The machine also includes at least one hinge on each of two opposing sides of the machine. Each hinge includes two parts, one part attached to the cover near its lower margin and one part attached to the tank near its upper margin. One of the hinge parts comprises a hinge pin and one of the parts comprises an open hinge socket. The open hinge socket is adapted to receive the hinge pin and retain the hinge pin in rotatable relation when the side of the cover opposite the hinge is raised, and to release the hinge pin when the side of the cover adjacent the hinge pin is raised, so that the cover may be rotated around an axis of rotation of a hinge on either side of the machine, thereby allowing access to the entire interior of the machine by the sequential raising of both sides of the cover, one side at a time. The machine additionally includes an operator which has at least one power cylinder with one end pivotally mounted to the tank, each cylinder having a piston rod extending therefrom, the piston rod at its end opposite the cylinder mounted pivotally to the cover. The operator functions to open both sides of the machine, one side at a time by rotating the cover around a hinge on one side while raising the cover on the opposing side.

A primary object of the invention is to provide an industrial food processing machine with a vaulted cover which may be opened from either side by the lifting of the cover on that side.

A further object of the invention is to provide an industrial food processing machine which has releasable hinges between the tank and cover on both sides of the machine so that either side of the cover may be raised by lifting a side of the cover, simultaneously causing the release of the hinges on that side and also causing the cover to rotate around the hinges on the opposite side.

A further object of the invention is to provide an industrial food processing machine with a cover which may be opened automatically on either side, one side at a time, using a pneumatic cylinder system.

Other objects, features, and advantages of the invention will be apparent from the following detailed description taken in conjunction with the accompanying drawings wherein a preferred embodiment of the invention has been selected for exemplification.

DESCRIPTION OF THE PREFERRED EMBODIMENT

Figure 1:
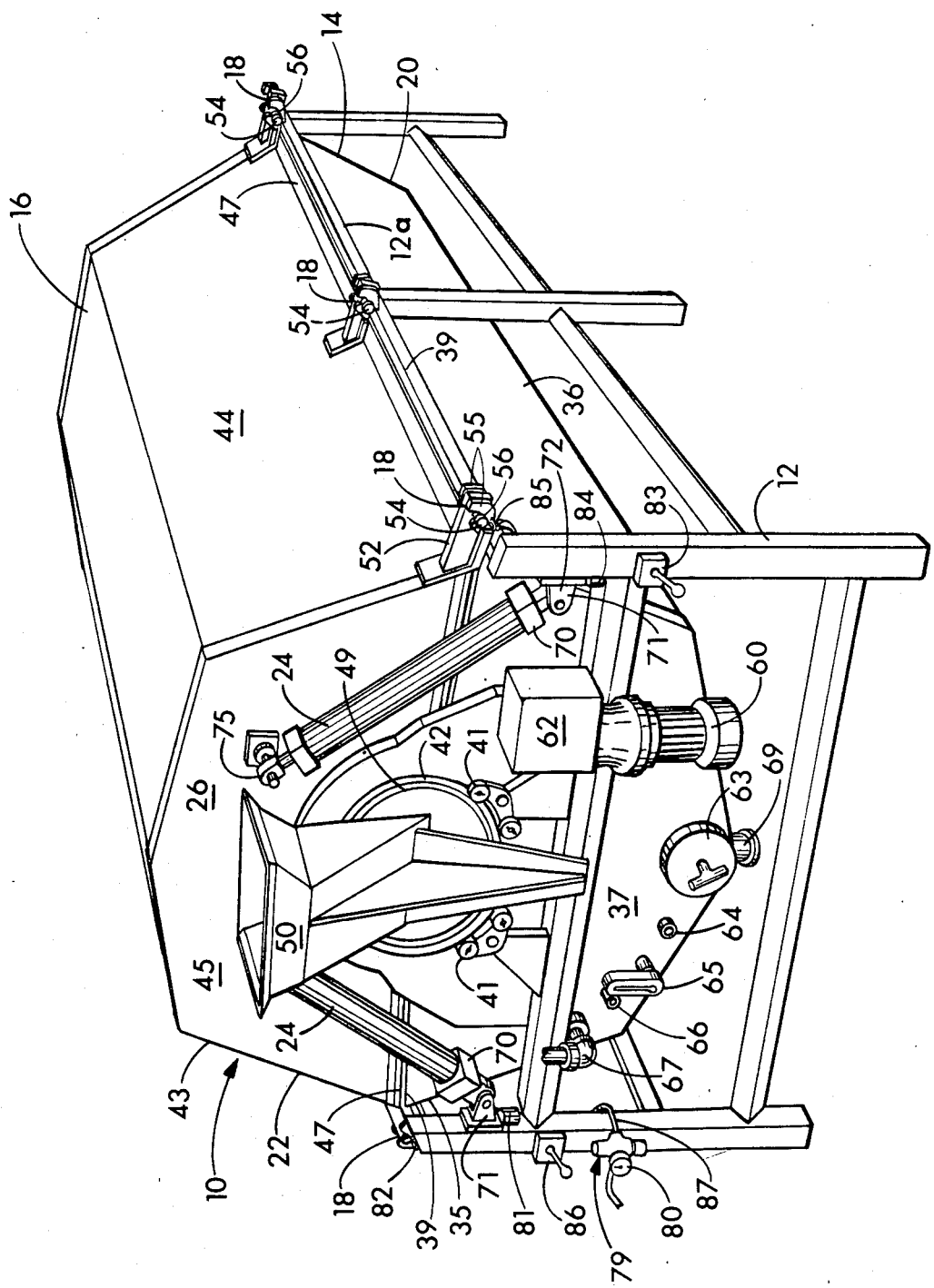
FIG. 1 is a perspective view of the industrial food processing machine of the invention with the cover closed.
Figure 2:
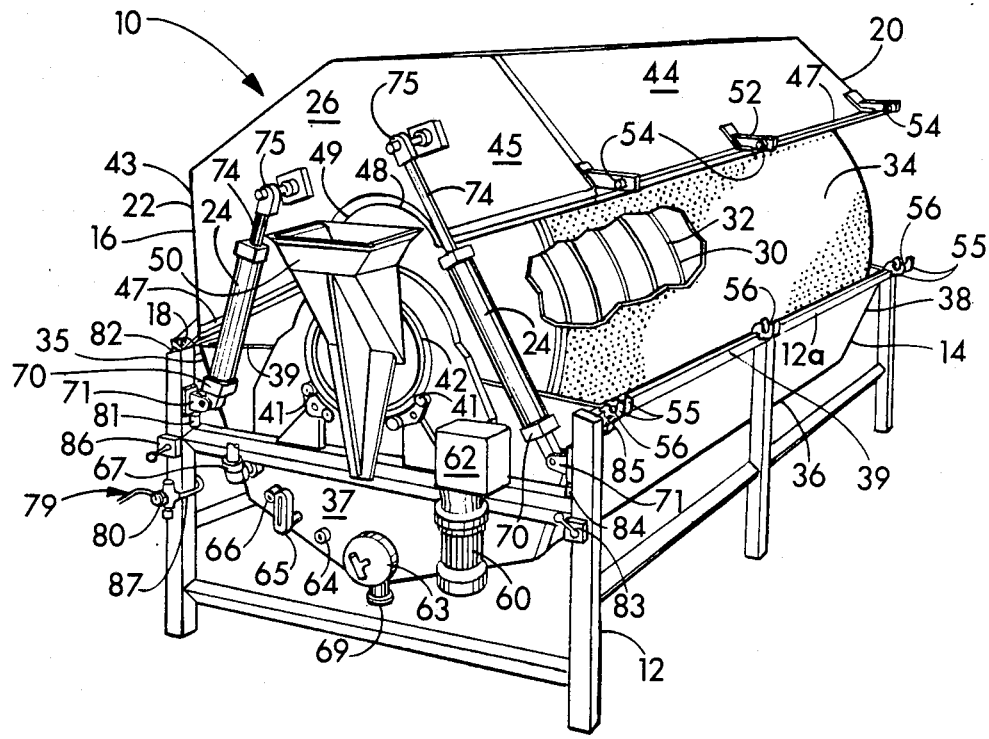
FIG. 2 is a perspective view of the industrial food processing machine of FIG. 1 with the right side of the cover partially open.
Figure 3:
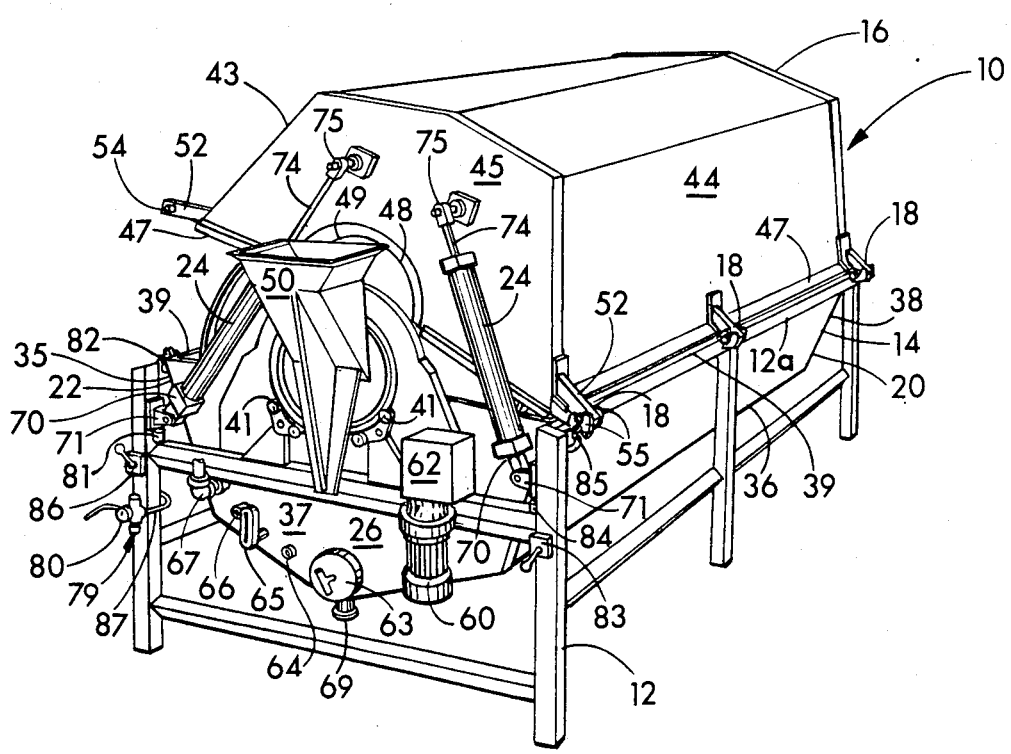
FIG. 3 is a perspective view of the industrial food processing machine of FIG. 1 with the left side of the cover partially open.
Figure 4:
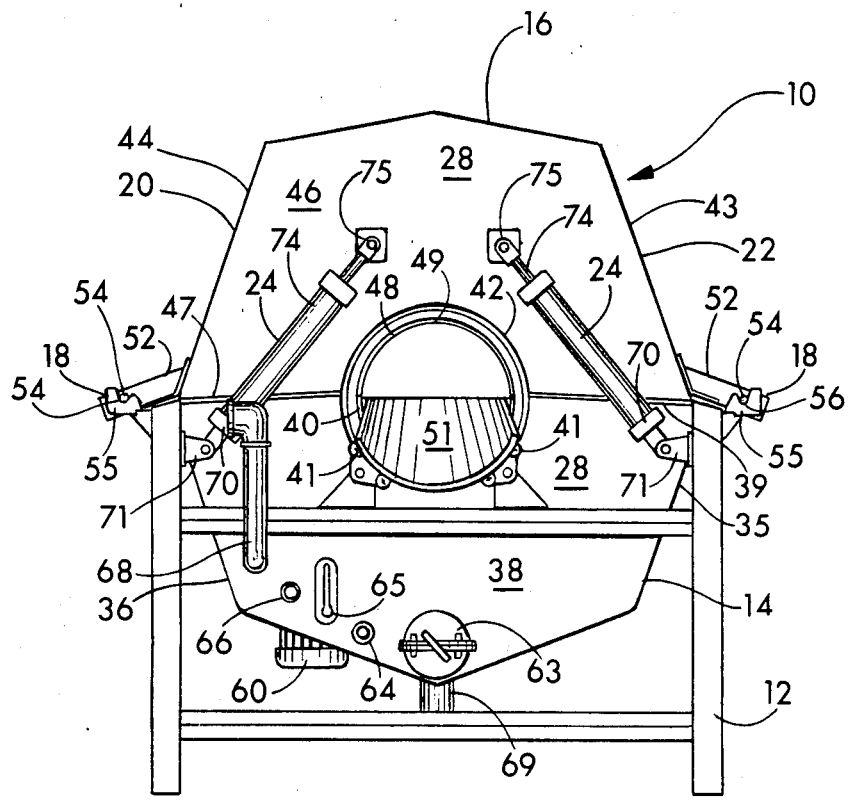
FIG. 4 is an elevation view of the discharge end of the industrial food processing machine of FIG. 1.

Referring more particularly to the drawings, wherein like numbers refer to like parts, FIG. 1 shows an industrial food processing machine 10 commonly called a blancher, having an elongated open top tank 14 supported by a frame 12, an elongated vaulted cover 16 adapted to fit over the tank 14, three hinges 18 pivotally and releasably connecting the cover 16 to the tank 14 on each side of the blancher 10, and a pair of pneumatic cylinders 24 mounted on each end of the blancher 10. FIGS. 1–3 show the inlet end 26 and right side 20 of the blancher, while FIG. 4 shows the discharge end 28 of the blancher. FIGS. 2 and 3 illustrate that access may be obtained to the interior 29 of the blancher 10 by raising the cover on either the left or right sides 22 and 20, respectively, of the blancher 10 as will be more fully explained.

Referring to FIG. 2, located within the interior of the blancher 10 is a longitudinally mounted conventional helical auger 30 which has stainless steel flights 32 wound around a central tube (not shown). A removable screen 34 for containing the food being processed substantially encloses the entire auger 30. A portion of the screen 34 is cut away in FIG. 2 to show the auger 30. When the auger 30 rotates, its steel flights 32 move the food being processed from the inlet end 26 to the discharge end 28 of the blancher 10 in a conventional manner.

The preferred industrial food processing machine 10 has a tank 14 with a frame 12 which also supports the rest of the machine 10. The tank 14 has a left side 35, right side 36, an inlet end 37, and a discharge end 38, all of which define an upper margin 39 of the tank 14 as shown in FIGS. 1–4. A portion of the upper margin 39 on each end 37, 38 of the tank 14 defines a semicircle 40 near which the bearings 41 that support the auger 30 and allow it to rotate, are mounted. The bearings 41 on each end of the machine 26, 28 are mounted so that they support the journal 42 connected to the auger 30 central tube in a conventional manner such that the journal 42 does not make contact with the upper margin 39.

The vaulted cover 16 of the preferred industrial food processing machine 10 has a left side 43, right side 44, inlet end 45 and discharge end 46 all of which define a lower margin 47 of the cover 16. Somewhat mirroring the tank 14, a portion of the lower margin 47 at each end 45, 46 of the cover 16 defines a semicircle 48. These semicircles 48 are adapted so that no portion of the lower margin 47 of the cover 16 makes contact with the auger 30 journal 42, even when the cover 16 is rotating to either side 35, 36 to open or close. The semicircles 40, 48 on the cover 16 and tank 14, together form centrally located circular openings 49 at both ends 26, 28 of the machine 10. Referring to FIG. 1, a funneled spout 50 extends down into the centrally located circular opening 49 on the inlet end 26 of the machine 10 to guide food into the interior of the machine 10. In the preferred embodiment, the funneled spout 50 is connected to and supported entirely from a portion of the frame 12 which is adjacent to the inlet end 37 of the tank 14. Referring to FIG. 4, a chute 51 extends down from the centrally located circular opening 49 at the discharge end 28 of the blancher 10 to direct processed food out of the blancher 10. The chute 51 is preferably connected to and supported entirely from a portion of the frame 12 which is adjacent to the discharge end 38 of the tank 14.

Figure 5:
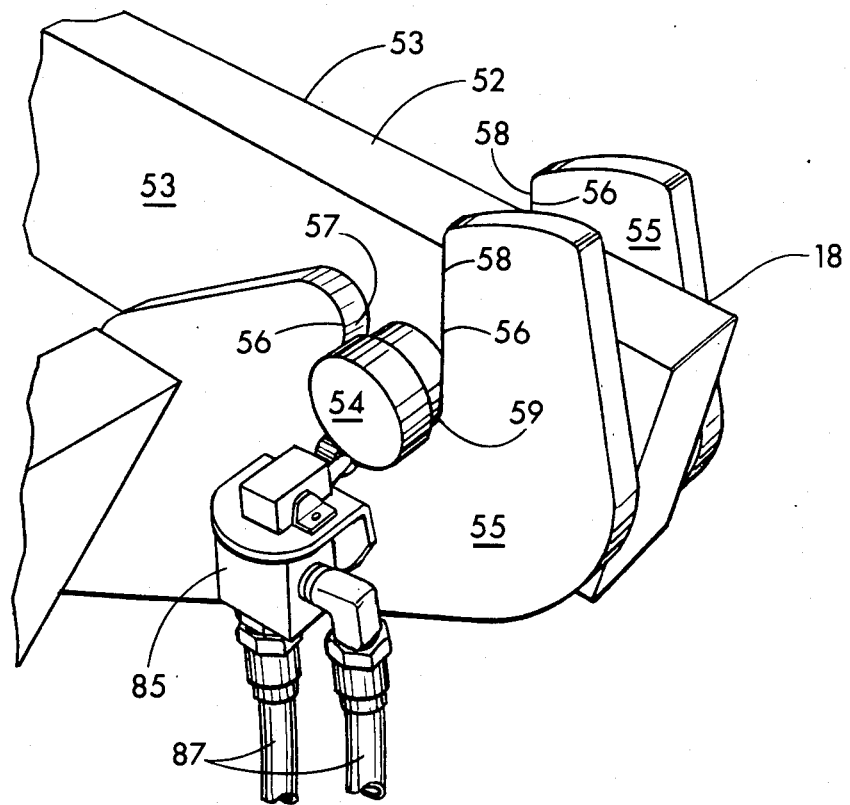
FIG. 5 is a perspective view of a hinge between the tank and cover of the industrial food processing machine of the invention.

The preferred industrial food processing machine 10 has three hinge cantilevers 52 which extend outwardly and slightly downwardly from the lower margin 47 on each side 43, 44 of the cover 16. As best shown in FIG. 5, each of the six hinge cantilevers 52 on the cover 16 has two vertical faces 53 which face in opposite directions and define the thickness of the hinge cantilever 52. Extending normally from each vertical face 53, near the outer end of the hinge cantilever 52, is a hinge pin 54.

Referring to FIG. 1, the blancher support frame 12 includes a side member 12a which extends along and supports the upper margin 39 of the tank 14 at each of its sides 35, 36. Three pairs of hinge plates 55 extend generally outwardly from the side members 129 on each side 35, 36 of the tank 14. Each hinge plate has a hinge socket 56 which opens upwardly to receive a corresponding hinge pin 54 as shown in FIG. 5. Whenever either side 22, 20 of the cover 16 is raised, the hinge pins 54 on the raised side 22, 20 are lifted from their respective hinge sockets 56, as shown in FIGS. 2 and 3. At the same time, the hinge pins 54 on the side 22, 20 of the cover 16 which is not raised remain and rotate within their respective hinge sockets 56 in rotatable support of the cover 16. When the cover 16 is lowered again, the hinge pins 54 which were lifted return to their respective hinge sockets 56 as shown in FIG. 1.

As shown in FIG. 5, each hinge socket 56 is defined by an inner wall 57, an outer wall 58, and an arcuate socket bottom 59. The inner walls 57 of all the sockets 56 on a particular side 35, 36 of the tank 14 are co-planar, and similarly, the outer walls 58 on a particular tank side 35, 36 also are co-planar. The bottoms of the hinge sockets on a particular 35, 36 side of the tank 14 have centers which are coaxial. The hinge pins 54 which fit into the sockets 56 on a particular side 20, 22 of the machine likewise all have coaxial axes. In this manner, the hinge pins 54 and hinge sockets 56 on a particular side 20, 22 of the machine 10 together define an axis of rotation about which the cover 16 may rotate when opened on the opposite side 43, 44. Since each hinge socket 56 receives a hinge pin 54, the hinge plates 55 within each pair of hinge plates are separated by a distance which is slightly greater than the thickness of the hinge cantilever 52 having two corresponding hinge pins 54, so that the hinge cantilever 52 may rest between the paired hinge plates 55 while its hinge pins 54 rest in their respective hinge sockets 56 in the pair of hinge plates 55.

In the preferred industrial food processing machine 10, the frame 12, tank 14, cover 16 and hinges 18 are formed of stainless steel which is strong, does not corrode easily, and is cleaned without difficulty therefore making it very suitable for use in the food industry. Any other material with suitable strength, durability and which also has favorable cleaning properties may be used in modifications of the machine 10.

Connected to the ends of the helical auger 30 central tube (not shown) are journals 42 which rest on the bearings 41 located at the ends 37, 38 of the tank 14. The motor 60 and reducer 62 as shown in FIG. 1 are used to drive the helical auger 30 at a desired constant speed in a conventional manner.

Located near the bottom of the each end 37, 38 of the preferred tank 14 will typically be a cleanout 63, a pipe connection 64 for a steam injector for heating the water in the tank 14, a pipe connection for thermometer 65, and a pipe connection 66 for a controller sensing bulb, as shown in FIGS. 1, 4 and 6. The controller sensing bulbs in combination with other control mechanisms thermostatically control the amount of steam going to the tank water, thereby developing and maintaining the desired water temperature in the tank 14. In addition, near the bottom of the tank inlet end 37 is a pipe connection for water supply 67, while near the bottom of the tank discharge end 38 is a pipe connection with adjustable swing elbow overflow to limit the water level 68 within the tank 14. Underneath the tank 14 near each end 37, 38 is a drain 69. The illustrated cleanout pipe connections and drains are conventional.

In the preferred embodiment of the invention, conventional ventilation intakes may be located over the funneled spout 50 at the machine inlet end 26 and over the chute 51 and the machine discharge end 28 to remove steam which has escaped from the machine 10 to the atmosphere. In modifications, ventilation pipes may also be placed in the cover 16 to vent excess steam.

Referring to FIGS. 1-4, a pair of pneumatic cylinders 24 are located at each end of the preferred blancher 10 to provide power operating means for pivotally lifting the considerable mass of the cover 16 to selectively expose either side of the interior of the tank 14 and cover 16. The cylinders 24 each cooperate with a like cylinder at the opposite end of the machine to raise and lower one side 43 or the other 44 of the cover 16, as desired. The lower end 70 of each cylinder is pivotally mounted to a vertical portion of the support frame 12 at the sides of the frame. In the preferred embodiment, a small plate with central hole extends from the ends of the cylinder 24 and is pivotally engaged by a pin 72 to bracket 71 mounted on the frame 12. Each cylinder 24 has a piston rod 74 extending therefrom with a piston rod end 75 which is pivotally mounted on an end of the cover 16. As shown in FIGS. 1-4, the piston rod ends 75 are each mounted in a generally central portion of the cover ends 45, 46. In the preferred embodiment, the piston rod ends 75 are pivotally mounted on pins extending from the ends of the cover 16. While we have found that the aforementioned means for mounting the cylinders 24 and piston rods 74 to the machine 10 is preferred, other means of attachment may be used which permit rotation of the cover 16.

Referring once again to FIG. 1, pneumatic cylinder controls are located near the inlet end 26 of the preferred food processing machine. These controls include an air regulator 80, a left pilot valve 81, a left microswitch 82, a right hand control 83, a right pilot valve 84, a right microswitch 85, and a left hand control 86. The left and right microswitches 82, 85 are respectively located on the hinges 18 on each machine side 22, 20 which are nearest to the machine inlet end 26.

The industrial food processing machine 10 of FIG. 1 is utilized in blanching, cooking or cooling foods before canning or freezing them in a conventional manner. First the tank 14 is partially filled with water of the desired temperature. When that temperature is reached, the motor 60 is turned on to rotate the helical auger 30, and food is continuously fed into the funneled spout 50 at the machine inlet end 26. Food may be continuously fed through the machine 10 at a rate which subjects the food to the desired temperature conditions of the water for a desired period of time. The helical auger 30 gently but positively moves the food from the inlet end 25 to the discharge end 38 of the tank 14. After all of the food has been discharged, the motor 60 with auger 30 and water heating controls may be turned off, and the tank 14 emptied of water. The machine 10 must then be completely cleaned before it may be used again to process food.

During cleaning, and sometimes during interruptions in the processing operation, it is highly desirable to have open access to all inside surfaces of the tank 14 and cover 16, and to the helical auger 30 and cylindrical screen 34. This is easily accomplished with the two-way opening cover 16, either side of which may be quickly and easily pivoted to an open position. To open the left side 22 of the machine for example, the user simply pulls the lever on the left hand control 86 of the preferred pneumatic control system 79 of the power operating means to the up position. The right hand control 83 lever should remain in the down position. The left side 43 of the cover will be raised by the piston rods 74 of the cylinders 24 on each end of the machine which are attached to the frame 12 adjacent to the left side 35 of the tank 14. As the left side 43 of the cover is forced upwardly by the appropriate piston rods 24, the cover will rotate around the hinges 18 on the right side 20 until the piston rods 74 reach the end of their travel, thereby opening the left side 43 of the cover 16. At the same time that the cylinders 24 on the left side 22 of the blancher 10 are pressurized to raise, hold open and lower the left side 43 of the cover 16, the cylinders on the right side 20 of the blancher 10 are open to exhaust to permit their piston rods 74 to follow the cover to which they are attached as it pivotally opens and closes, without restricting movement of the cover. The cover 16 may be lowered to its closed position by moving the lever on the left hand control 86 to its down position.

The right side 20 of the blancher 10 may be opened and closed in a similar manner by moving the lever on the right hand control 83 to its up and down positions, respectively. During opening and closing of the right side 44 of the cover 16, the cylinders 24 on the right side 20 of the blancher 10 are pressurized, and the cylinders on the left side 22 are open to exhaust.

Referring to FIG. 1, the pneumatic control system 79 is designed to effectively direct the pressurized air to the cylinders 24 for operation of the two-way opening cover 16 in a safe and efficient manner. The pressurized air is routed through the single air regulator 80 to opposite sides 22, 20 of the machine 10 by air lines 87 (partially shown). The air is routed by the air lines 87 to the right pilot valve 84 (normally open), and from there to the right microswitch 85 (open when cover 16 is down on the right side 44), and then to the left hand control 86 (normally closed). Likewise, the air is directed by air lines 87 to the left pilot valve 81 (normally open), and from there to the left microswitch 82 (open when cover 16 down on the left side 43), and then to the right hand control 83 (normally closed). In operation, when the left hand control lever 86 is moved to an up (pressure) position, air from the right pivot valve 84 and the right microswitch 85 proceeds through the left hand control 86 to two locations. Air is routed to the pneumatic cylinders 24 on the left side 22 of the blancher 10, which together raise the left side 43 of the cover 16 as described above. Air also goes to the left pilot valve 81 to close it so that no air may go from the left pilot valve 81 through the left microswitch 82 and right hand control 83 (if the right hand control 83 were accidently placed in the up position) to the rightmost cylinders 24 to raise the right side 44 of the cover 16. As an additional safety feature, the air line 87 to the two cylinders 24 on the right side 20 of the blancher 10 is cut off at another point. When the left side 43 of the cover 16 raises, the hinge pins 54 on the left side 22 of the machine 10 are raised out of their respective hinge sockets 56. The left microswitch 82 (open when the hinge pin 54 is seated in the hinge socket 56 on the left side 22 of the machine when the left side 43 of the cover 16 is down) then closes as the hinge pins raise to shut off the air supply for the right hand control 83 and the two right side cylinders 24. In addition, when the right hand control 83 lever is in its normally down position as it would be in this example, the two right side cylinders 24 are allowed to bleed to exhaust through the right hand control 83, thereby allowing air to freely enter and exit those two cylinders 24. This free-flow in the right side cylinders 24 allows the piston rods 74 of those cylinders to follow the movement of the cover 16 freely as it is pivoted by the left side cylinders 24, as previously indicated. To lower the cover 16, the user then moves the lever on the left hand control 86 to the down position. This allows the air to bleed at a controlled rate from the left side cylinders 24, thereby allowing the cover 16 to completely close.

When the right side 20 of the preferred industrial food processing machine is opened or closed, the movement and restriction of pressurized air through the pneumatic system essentially mirrors its motion through the system in the above example where the left side 22 was opened and closed.

Accordingly, either side 20, 22 of the machine may be opened to obtain access to the blancher interior 29, and to the cylindrical screen 34 and helical auger 30. In succession, both sides may be opened to gain access to the screen 34 and auger 30 from both sides 35, 36 of the tank 14. After inspection, maintenance or cleaning, the cover 16 may be closed and the machine 10 is ready for startup for processing more food.

Other equivalent operators, such as hydraulic cylinders or jack screws, could be employed to selectively rotate both sides of the cover about the hinge axes, one side at a time, without departing from the principles of the invention, but pneumatic cylinders arranged as shown are preferred.

It is to be understood that the present invention is not limited to the particular arrangement and embodiment of parts disclosed and illustrated herein, but embraces all such modified forms thereof as come within the scope of the following claims.

What is claimed is:

1. An industrial food processing machine which utilizes an enclosed environment to subject a food product flow to a continuous, controlled temperature treatment in water, and which also provides access to its entire interior for the cleaning or maintenance thereof, comprising:

(a) an elongated open top tank which has a body with a pair of ends and elongated sides, the ends and sides defining the upper margin of the tank, the tank being adapted to contain apparatus for conveying food products through a liquid environment in the tank;

(b) an elongated cover with a pair of ends and elongated sides, the ends and sides defining the lower margin of the cover, the lower margin of the cover adapted to fit on the upper margin of the tank to effectively close the tank;

(c) at least one releasable hinge on each of two opposing sides of the machine, each hinge including two parts, one part attached to the cover near its lower margin and one part attached to the tank near its uuper margin, one of these parts comprising a hinge pin, and one of these parts comprising a hinge plate with an open hinge socket wherein the open hinge socket is adapted to receive the hinge pin and to retain the hinge pin in rotatable relation when the side of the cover opposite the said hinge is raised and to release the hinge pin when the side of the cover adjacent the hinge is raised, so that the cover may be rotated around an axis of rotation of a hinge on either side of the machine, thereby allowing access to the entire interior of the machine by the selective raising of both sides of the cover, one side at a time; and (d) an operator comprising at least two power cylinders, each cylinder having a piston rod extending therefrom and having one end which is pivotally mounted to the tank, the piston rod at its end opposite the cylinder being mounted pivotally to the cover, at least one cylinder being operable to raise one side of the cover, and at least one other cylinder being operable to raise the other side of the cover; and control means for pressurizing and exhausting the cylinders to selectively open each side of the machine, one side at a time, by rotating the cover around a hinge on one side while raising the cover on the opposing side.

2. The industrial food processing machine specified in claim 1, wherein the hinge pins are attached to the cover and have axes which are parallel to a longitudinal axis of the machine, all the hinge pins on an individual side of the machine being coaxial, and wherein the hinge plates are attached to the tank and each open socket therein is defined by an inner wall, an outer wall and an arcuate bottom, all the bottoms on an individual side of the machine being substantially coaxial so that the hinge pins and hinge sockets on each side substantially determine an axis of rotation about which the cover may rotate.

3. The industrial food processing machine specified in claim 2, wherein the cover further includes on each side near its lower margin a plurality of hinge cantilevers extending outwardly from the margin in a slightly downward direction, each cantilever having a hinge pin extending normally therefrom, and wherein the tank further includes an elongated support frame which partially forms the upper margin of the tank on the tank sides, and a plurality of hinge plates on each side of the tank extending generally outwardly from the upper margin of the tank, each hinge plate having an open hinge socket, the hinge sockets releasably receiving in pivotal relation the hinge pins located on a single hinge cantilever.

4. An industrial food prodessing machine which utilizes an enclosed environment to subject a food product flow to a continuous, controlled temperature treatment in water, and which also provides access to its entire interior for the cleaning or maintenance thereof, comprising:

(a) an elongated open top tank which has a body with a pair of ends and elongated sides, the ends and sides defining the upper margin of the tank, the tank being adapted to contain apparatus for conveying food products through a liquid environment in the tank;

(b) an elongated cover with a pair of ends and elongated sides, the ends and sides defining the lower margin of the cover, the lower margin of the cover adapted to fit on the upper margin of the tank to effectively close the tank;

(c) at least one releasable hinge on each of two opposing sides of the machine, each hinge including two parts, one part attached to the cover near its lower margin and one part attached to the tank near its upper margin, one of these parts comprising a hinge pin, and one of these parts comprising a hinge plate with an open hinge socket wherein the open hinge socket is adapted to receive the hinge pin and to retain the hinge pin in rotatable relation when the side of the cover opposite the said hinge is raised and to release the hinge pin when the side of the cover adjacent the hinge is raised, so that the cover may be rotated around an axis of rotation of a hinge on either side of the machine, thereby allowing access to the entire interior of the machine by the selective raising of both sides of the cover, one side at a time; and (d) an operator comprising at least one power cylinder with one end pivotally mounted to the tank, each cylinder having a piston rod extending therefrom, the piston rod at its end opposite the cylinder mounted pivotally to the cover, wherein the operator may open both sides of the machine, one side at a time, by rotating the cover around a hinge on one side while raising the cover on the opposing side;

wherein the hinge pins are attached to the cover and have axes which are parallel to a longitudinal axis of the machine, all the hinge pins on an individual side of the machine being coaxial;

wherein the hinge plates are attached to the tank and each open socket therein is defined by an inner wall, an outer wall and an arcuate bottom, all the bottoms on an individual side of the machine being substantially coaxial so that the hinge pins and hinge sockets on each side substantially determine an axis of rotation about which the cover may rotate;

wherein the cover further includes on each side near its lower margin a plurality of hinge cantilevers extending outwardly from the margin in a slightly downward direction, each cantilever having a hinge pin extending normally therefrom;

wherein the tank further includes an elongated support frame which partially forms the upper margin of the tank on the tank sides, and a plurality of hinge plates on each sides of the tank extending generally outwardly from the upper margin of the tank, each hinge plate having an open hinge socket, the hinge sockets releasably receiving in pivotal relation the hinge pins located on a single hinge cenatilever; and wherein each hinge has a pair of spaced hinge plates with coaxial sockets, the hinge plates being spaced apart a sufficient distance to receive and longitudinally confine therebetween a hinge cantilever when the hinge pin extending from the cantilever is engaged in the open sockets of the spaced hinge plates.

5. The industrial food processing machine specified in claim 2 wherein the hinge plates define a socket outer wall of sufficient dimension and the plates are of sufficient strength to resist transverse movement of the hinge pins during pivoting movement of the cover about the axis of rotation.

6. An industrial food processing machine which utilizes an enclosed environment to subject a food product flow to a continuous, controlled temperature treatment in water, and which also provides access to its entire interior for the cleaning or maintenance thereof, comprising:

(a) an elongated open top tank which has a body with a pair of ends and elongated sides, the ends and sides defining the upper margin of the tank, the tank being adapted to contain apparatus for conveying fooed products through a liquid environment in the tank;

(b) an elongated cover with a pair of ends and elongated sides, the ends and sides defining the lower margin of the cover, the lower margin of the cover adapted to fit on the upper margin of the tank to effectively close the tank;

(c) at least one releasable hinge on each of two opposing sides of the machine, each hinge including two parts, one part attached to the cover near its lower margin and one part attached to the tank near its upper margin, one of these parts comprising a hinge pin, and one of these parts comprising a hinge plate with an open hinge socket wherein the open hinge socket is adapted to receive the hinge pin and to retain the hinge pin in rotatable relation when the side of the cover opposite the said hinge is raised and to release the hinge pin when the side of the cover adjacent the hinge is raised, so that the cover may be rotated around an axis of rotation of a hinge on either side of the machine, thereby allowing access to the entire interior of the machine by the selective raising of both sides of the cover, one side at a time; and (d) an operator comprising at least one power cylinder with one end pivotally mounted to the tank, each cylinder having a piston rod extending therefrom, the piston rod at its end opposite the cylinder mounted pivotally to the cover, wherein the operator may open both sides of the machine, one side at a time, by rotating the cover around a hinge on one side while raising the cover on the opposing side;

wherein the operator comprises a pair of cylinders mounted at each end of the machine, one cylinder of each pair for raising one side of the cover and the other cylinder of each pair for raising the other side of the cover, and the operator further includes control means for pressurizing one cylinder of each pair to rotate the cover about a selected hinge axis and exhausting the other non-operating cylinder of the pair to allow its piston rod to move freely in and out of the cylinder so that the non-pressurized cylinder freely permits the cover to rotate as determined by the pressurized cylinder.

7. The industrial food processing machine specified in claim 6, wherein the cylinders are pneumatic and wherein a first microswitch is positioned to be opened when the hinge pins on one side of the machine are fully engaged within the associated hinge sockets to permit air to be directed to the cylinders which cause rotation of the cover about the axis of the engaged hinge pins and sockets and to be closed when the hinge pins on said one side are released from the hinge sockets to prevent air from being directed to said cylinders which cause rotation of the cover about the axis of the said hinge pin and sockets, on the said one side, and further wherein a second microswitch is positioned to be opened and closed in response to the respective engagement and release of the hinge pins on the other side of the machine to respectively permit and prevent direction of air to the cylinders which cause rotation of the cover about the axis of the hinge pins and sockets on the said other side in like manner.

8. An industrial food processing machine which utilizes an enclosed environment to subject a food product flow to a continuous, controlled temperature treatment in water, and which also provides access to its entire interior for the cleaning or maintenance thereof, comprising:

(a) an elongated open top tank which has a body with a pair of ends and elongated sides, the ends and sides defining the upper margin of the tank, the tank being adapted to contain apparatus for conveying a food product flow through a liquid environment in the tank;

(b) an elongated cover with a pair of ends and elongated sides, the ends and sides defining the lower margin of the cover, the lower margin of the cover adapted to fit on the upper margin of the tank to effectively close the tank;

(c) at least one releasable hinge on each of two opposing sides of the machine, each hinge including two parts, one part attached to the cover near its lower margin and one part attached to the tank near its upper margin, one of said parts being adapted to receive and retain the other said part in rotatable relation when the side of the cover opposite the said hinge is raised and to release the other said part when the side of the cover adjacent the hinge is raised, so that the cover rotates around an axis of rotation of a hinge on either side of the machine, thereby allowing access to the entire interior of the machine by the selective raising of both sides of the cover, one side at a time;

(d) an operator comprising a pair of pneumatic cylinders mounted at each end of the machine, one cylinder of each pair adapted to raise one side of the cover and the other cylinder of each pair adapted to raise the other side of the cover, the operator further comprising pneumatic control means for directing compressed air to one cylinder of each pair to rotate the cover about a selected hinge axis while exhausting the other cylinder of each pair to allow its associated piston to move freely in and out of the said other cylinder so that the cover is permitted to rotate as determined by the pressurized cylinder, the control means selectively permitting pressurization and exhaustion of either cylinder of each pair to cause one or the other sides of the cover to be selectively raised.

9. The industrial food processing machine specified in claim 8, wherein a first microswitch is positioned to be opened when the hinge pins on one side of the machine are fully engaged within the associated hinge sockets to permit air to be directed to the cylinders which cause rotation of the cover about the axis of the engaged hinge pins and sockets and to be closed when the hinge pins on said one side are released from the hinge sockets to prevent air from being directed to said cylinders which cause rotation of the cover about the axis of the said hinge pin and sockets, on the said one side, and further wherein a second microswitch is positioned to be opened and closed in response to the respective engagement and release of the hinge pins on the other side of the machine to respectively permit and prevent direction of air to the cylinders which cause rotation of the cover about the axis of the hinge pins and sockets on the said other side in like manner.

10. An industrial food processing machine which utilizes an enclosed environment to subject a food product flow to a continuous, controlled temperature treatment in water, and which also provides access to its entire interior for the cleaning or maintenance thereof, comprising:

(a) an elongated open top tank which has a body with a pair of ends and elongated sides, the ends and sides defining the upper margin of the tank, the tank being adapted to contain apparatus for conveying food products through a liquid environment in the tank;

(b) an elongated cover with a pair of ends and elongated sides, the ends and sides defining the lower margin of the cover, the lower margin of the cover adapted to fit on the upper margin of the tank to effectively close the tank;

(c) means for releasably hingedly engaging the cover to the tank in such a manner as to allow the cover to open on two opposing sides, one side at a time, by rotation of the cover around the releasably hingedly engaging means on one side while raising the cover on the opposite side releases the releasably hingedly engaging means on that opposite side, thereby allowing access to the entire interior of the machine by the sequential raising of both sides of the cover, one side at a time; and (d) pneumatic operator means for selectively raising the cover on both sides, one side at a time;

wherein the pneumatic operator means comprises a pair of pneumatic cylinders mounted at each end of the machine, one cylinder of each pair adapted to raise one side of the cover and the other cylinder of each pair adapted to raise the other side of the cover, the operator further comprising pneumatic control means for directing compressed air to one cylinder of each pair to rotate the cover about a selected hinge axis while exhausting the other cylinder of each pair to allow its associated piston to move freely in and out of the said other cylinder so that the cover is permitted to rotate as determined by the pressurized cylinder, the control means selectively permitting pressurization and exhaustion of either cylinder of each pair to cause one or the other sides of the cover to be selectively raised.

11. The industrcal food processing machine specified in claim 10, wherein the means for releasably hingedly engaging the cover to the tank comprises at least one releasable hinge on each of two opposing sides of the machine, each hinge including two parts, one part attached to the cover near its lower margin and one part attached to the tank near its upper margin, one of said parts being adapted to receive and retain the other said part in rotatable relation when the side of the cover opposite the said hinge is raised and to release the other said part when the side of the cover adjacent the hinge is raised, so that the cover rotates around an axis of rotation of a hinge on either side of the machine, thereby allowing access to the entire interior of the machine by the selective raising of both sides of the cover, one side at a time.

* * * * *